United States Patent
Steinhauser et al.

(10) Patent No.: US 7,717,821 B2
(45) Date of Patent: *May 18, 2010

(54) METHOD FOR THE OPERATION OF A DRIVETRAIN

(75) Inventors: Klaus Steinhauser, Kressbronn (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 377 days.

This patent is subject to a terminal disclaimer.

(21) Appl. No.: 11/811,151

(22) Filed: Jun. 7, 2007

(65) Prior Publication Data

US 2007/0287582 A1  Dec. 13, 2007

(30) Foreign Application Priority Data

Jun. 8, 2006  (DE) .................. 10 2006 026 600

(51) Int. Cl.
 *B60W 10/00* (2006.01)
 *F16H 61/40* (2006.01)
 *F16H 31/00* (2006.01)

(52) U.S. Cl. .................. 477/79; 477/68; 475/118; 475/120; 475/121; 475/127

(58) Field of Classification Search .................. 477/79, 477/68, 69, 70, 71; 475/116, 118, 120, 121, 475/127
See application file for complete search history.

(56) References Cited

U.S. PATENT DOCUMENTS

| | | | |
|---|---|---|---|
| 4,989,477 A * | 2/1991 | Hunter et al. ................ 477/148 |
| 5,113,343 A | 5/1992 | Hunter et al. | |
| 6,102,830 A * | 8/2000 | Tsutsui et al. ................ 477/143 |
| 6,508,742 B2 | 1/2003 | Popp et al. | |
| 6,577,939 B1 | 6/2003 | Keyse et al. | |
| 6,623,397 B1 | 9/2003 | Raghavan et al. | |
| 6,832,976 B2 * | 12/2004 | Nishida et al. ................ 477/120 |
| 7,048,673 B2 * | 5/2006 | Shim et al. ................ 477/143 |
| 7,374,512 B2 * | 5/2008 | Ayabe et al. ................ 477/133 |
| 2003/0220170 A1 | 11/2003 | Nishida et al. | |
| 2005/0282680 A1 | 12/2005 | Soh | |

(Continued)

FOREIGN PATENT DOCUMENTS

DE   199 18 734 A1   11/2000

(Continued)

OTHER PUBLICATIONS

Translation of DE10338624.*

(Continued)

*Primary Examiner*—Tisha D Lewis
(74) *Attorney, Agent, or Firm*—Davis & Bujold, P.L.L.C.

(57) ABSTRACT

A method for operation of a drivetrain including a drive motor and an automatic transmission having at least five shift elements, of which, at least three shift elements are engaged in each forward and reverse gear and the other shift elements are disengaged. Two successive shifts are accomplished by two overlapped single gear shifts such that a) during the first shift, a first shift element is engaged or disengaged while a second shift element is disengaged or engaged; b) during the first shift, second and third shift elements are prepared for either engagement or disengagement, and c) during the first and the second shifts at least one fourth shift element is kept engaged or nearly engaged.

11 Claims, 4 Drawing Sheets

U.S. PATENT DOCUMENTS

| | | |
|---|---|---|
| 2006/0046892 A1 | 3/2006 | Bucknor et al. |
| 2007/0129211 A1 | 6/2007 | Steinhauser et al. |
| 2008/0064566 A1* | 3/2008 | Lee .......................... 477/109 |

FOREIGN PATENT DOCUMENTS

| | | |
|---|---|---|
| DE | 199 28 674 A1 | 12/2000 |
| DE | 199 63 752 A1 | 7/2001 |
| DE | 100 35 479 A1 | 2/2002 |
| DE | 103 21 961 A1 | 2/2004 |
| DE | 103 38 624 A1 | 11/2004 |
| DE | 103 30 153 A1 | 2/2005 |
| DE | 103 61 288 A1 | 7/2005 |
| DE | 10 2004 001 380 A1 | 8/2005 |
| DE | 10 2004 010 269 A1 | 9/2005 |
| DE | 10 2005 008 383 A1 | 9/2005 |
| DE | 10 2004 040 611 A1 | 3/2006 |
| DE | 10 2004 041 507 A1 | 3/2006 |
| DE | 10 2004 043 345 A1 | 3/2006 |
| EP | 1 219 868 A2 | 7/2002 |
| EP | 1 398 536 A2 | 3/2004 |
| EP | 1 533 543 A2 | 5/2005 |
| WO | WO-2004/097266 A1 | 11/2004 |
| WO | WO-2005/065981 A1 | 7/2005 |

OTHER PUBLICATIONS

Translation of DE 102004001380.*

* cited by examiner

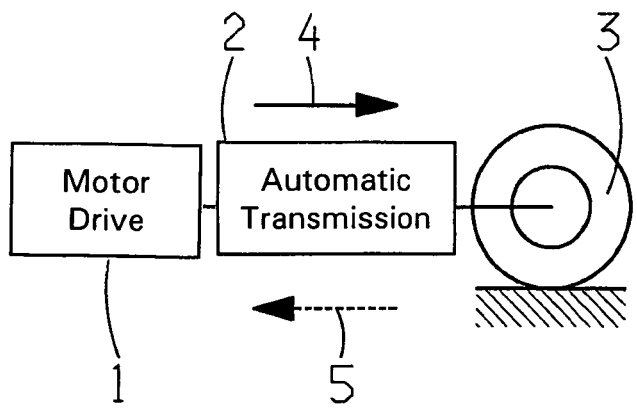
Fig. 1
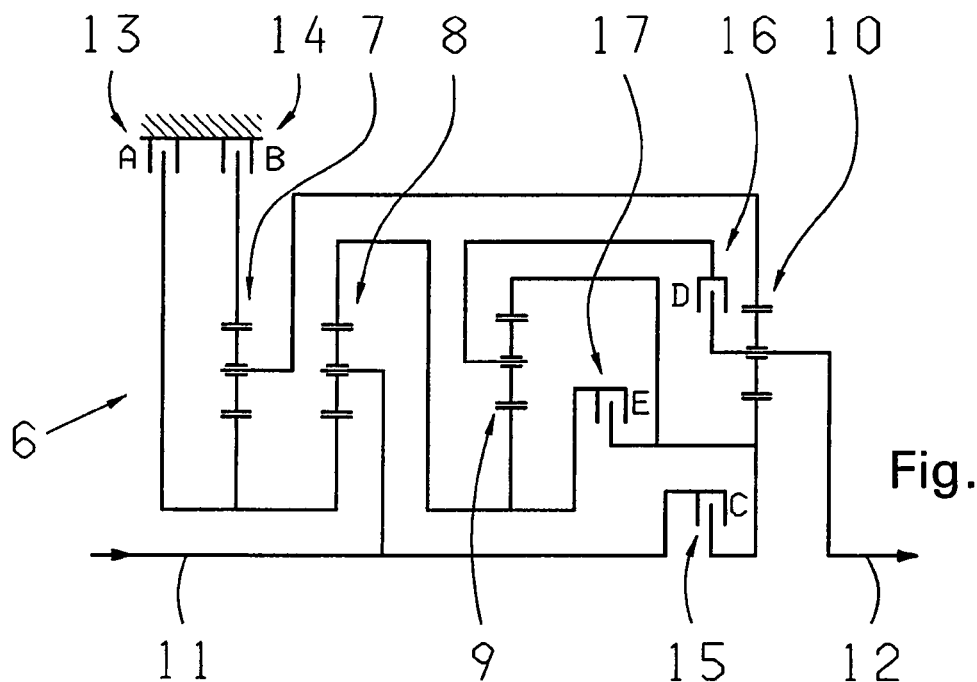
Fig. 2
Fig. 3

METHOD FOR THE OPERATION OF A DRIVETRAIN

This application claims priority from German Application Ser. No. 10 2006 026 600.5 filed Jun. 8, 2006.

FIELD OF THE INVENTION

The invention concerns a method for the operation of a drivetrain of a motor vehicle, comprising at least an automatic transmission and a drive aggregate.

BACKGROUND OF THE INVENTION

The main components of a motor vehicle drivetrain are a drive motor and a transmission. A transmission converts torques and speeds and so transforms the traction force provided by the drive motor. The present invention concerns a method for the operation of a drivetrain which comprises at least a drive motor and an automatic transmission. In the context of the present invention, the term "automatic transmission" is understood to mean any transmission that effects automatic gear changes, these also being known as variable speed transmissions.

From DE 100 35 479 A1, a method for operating an automatic transmission is known in which successive upshifts and successive downshifts can be carried out with some overlap in order to improve the shift speed. For this, during each first upshift or downshift, a shift element needed for the subsequent second upshift or downshift is prepared, while the first upshift or downshift is in progress, in such manner that when a synchronization point is reached, namely a synchronous speed of the first upshift or downshift in progress, the subsequent second upshift or downshift can be carried out immediately.

In this way, according to DE 100 35 479 A1, single shifts are overlapped with one another, which means that each first upshift or downshift carried out and each subsequent second upshift or downshift is a single shift between two directly successive gears.

The method known from DE 100 35 479 A1 can be used with an automatic transmission comprising five shift elements of which, for torque and force transfer in any forward gear and in a reverse gear, in each case two shift elements are engaged and three shift elements are disengaged. With such an automatic transmission, six forward gears can be engaged. In the development of automatic transmissions, however, a trend is perceptible towards constantly increasing the number of gears, in particular forward gears of the automatic transmission. Thus at present, automatic transmissions with eight forward gears and one reverse gear are being developed, such automatic transmissions having at least five shift elements such that, for torque or force transfer, at least three of these at least five shift elements are engaged in any forward gear and in a reverse gear while the other shift elements are disengaged. For such an automatic transmission, the method known from DE 100 35 479 A1 is not suitable.

Starting from this, the present invention addresses the problem of providing a new type of method for the operation of a drivetrain comprising at least an automatic transmission and a drive motor.

SUMMARY OF THE INVENTION

According to a first embodiment of the invention, in an automatic transmission with at least five shift elements of which, for torque or force transfer in any forward gear and in a reverse gear, at least three shift elements are engaged and the other shift elements are disengaged, two respective consecutive upshifts or two respective consecutive downshifts can be carried out with overlap in such a manner that:

a) when carrying out a first upshift or downshift, in accordance with a first alternative, a first shift element is disengaged or, in accordance with a second alternative, it is engaged and, in accordance with the first alternative, a second shift element is engaged or, in accordance with the second alternative, it is disengaged;

b) while the first upshift or downshift is being carried out, with a view to a subsequent second upshift or downshift, a second shift element is prepared for disengaging in accordance with the first alternative or for engaging in accordance with the second alternative and a third shift element is prepared for disengaging in accordance with the first alternative or for disengaging in accordance with the second alternative; the second shift element, selected from a minimum number, in the first alternative, or a maximum number of shift elements, in the second alternative, is actuated on transition from the first upshift or downshift;

c) while the first upshift or downshift is being carried out and while the second upshift or downshift is being carried out, at least one fourth shift element is kept engaged or nearly engaged.

According to a second embodiment of the invention, in an automatic transmission with at least five shift elements of which, for torque or force transfer in any forward gear and in a reverse gear, at least three shift elements are engaged and the other shift elements are disengaged, while a first upshift or downshift is being carried out and with a view to a subsequent second upshift or downshift, a shift element that is to be engaged during the second upshift or downshift is prepared for engaging at a time that occurs before the synchronization point of the first upshift or downshift has been reached, by a time interval that can be applied in a time-controlled or in an event-controlled manner.

According to a third embodiment of the invention, in an automatic transmission with at least five shift elements of which, for torque or force transfer in any forward gear and in a reverse gear, at least three shift elements are engaged and the other shift element are disengaged, while a first upshift or downshift and/or while a second subsequent upshift or downshift is being carried out, a torque of the drive motor is increased and/or decreased compared with a drive motor torque deduced from a driver's wish in order to assist in the overlapped implementation of successive upshifts or downshifts.

The above three embodiments according to the invention can be used either alone or in a combination of two embodiments or in a combination of all three embodiments for the operation of a drivetrain.

BRIEF DESCRIPTION OF THE DRAWINGS

The invention will now be described, by way of example, with reference to the accompanying drawings in which:

FIG. 1 is a drivetrain layout of a motor vehicle;

FIG. 2 is a transmission layout of an automatic transmission of the drivetrain with five shift elements;

FIG. 3 is a shift element matrix for the shift elements of the transmission layout in FIG. 2, to indicate which shift elements are engaged in which gear;

DETAILED DESCRIPTION OF THE INVENTION

Figure 4:
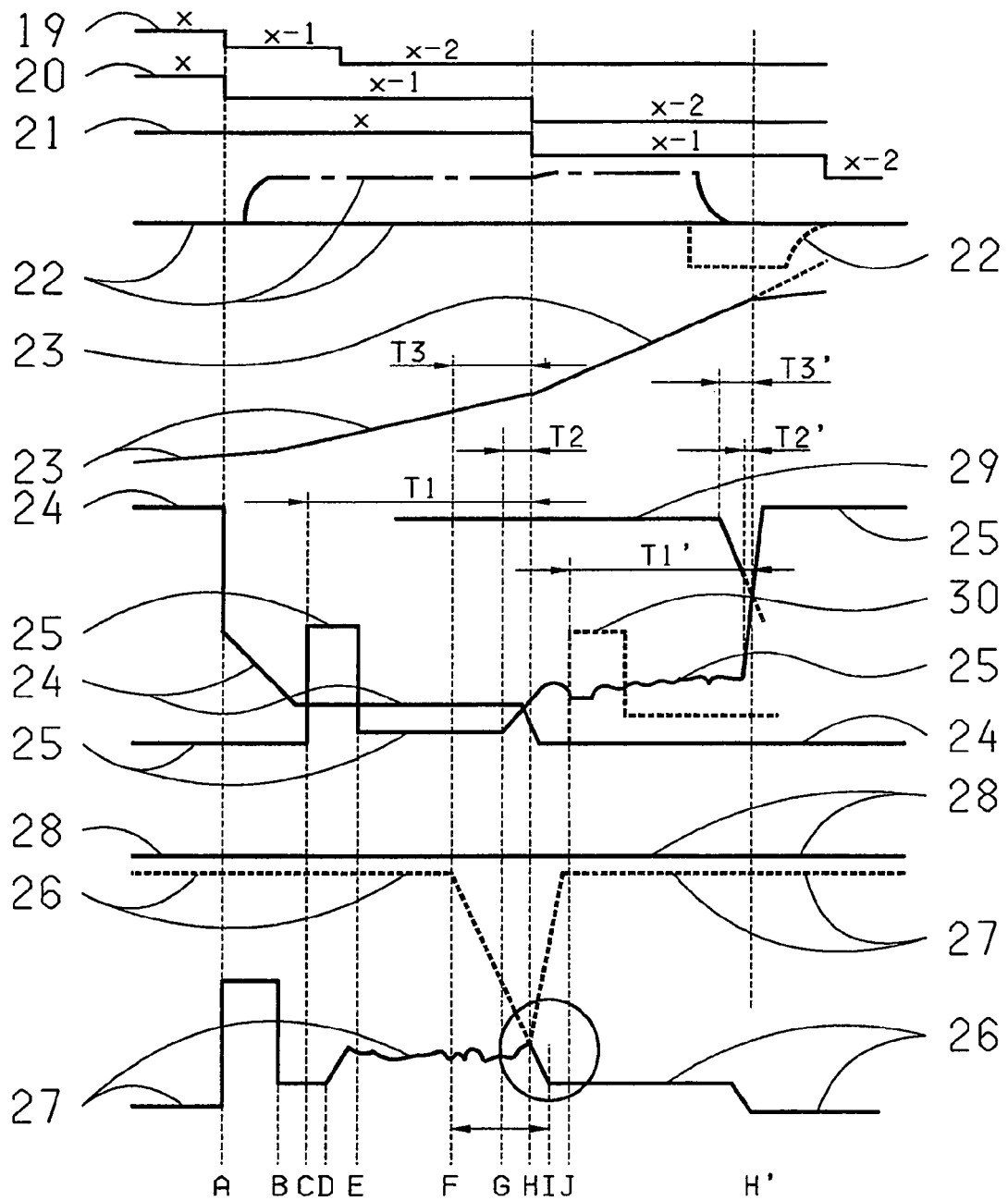
FIG. 4 is a first diagram to aid in understanding the method, according to the invention, for operating a drivetrain of a motor vehicle, which comprises an automatic transmission, according to FIGS. 2 and 3.

FIG. 1 shows a schematic representation of a drivetrain of a motor vehicle, the drivetrain comprising a drive motor 1, an automatic transmission 2 and a drive wheel 3 of the motor vehicle. The automatic transmission 2 transfers the traction force produced by the drive motor 1 to the wheels 3 of the motor vehicle. According to FIG. 1, when the drivetrain is operated in traction mode, power flows in the direction of arrow 4 from the drive motor 1 toward the wheels 3 of the motor vehicle. In contrast, if the drivetrain is operated in thrust mode, for example when braking or coasting, the power flow is in the direction of arrow 5, from the wheels 3 toward the drive motor 1.

The invention concerns a method for the operation of a drivetrain comprising the drive motor 1 and the automatic transmission 2, as is made clear by FIGS. 2 and 3. FIG. 2 shows a transmission layout 6 of the variable speed automatic transmission 2, which has four transmission gearsets 7, 8, 9 and 10 for the conversion of a transmission input torque applied at a transmission input 11 into a transmission output torque at a transmission output 12. According to FIG. 2, the transmission gearsets 7, 8, 9 and 10 of the automatic transmission 2 are made as planetary transmission gearsets.

As shown in the transmission layout 6 of FIG. 2, besides the four transmission gearsets 7-10 the automatic transmission also has a total of five shift elements 13, 14, 15, 16 and 17, the shift element 13 also being denoted as shift element A; shift element 14 as shift element B; shift element 15 as shift element C; shift element 16 as shift element D, and shift element 17 as shift element E. Shift elements A and B are each brakes, while each of shift elements C, D and E is a clutch.

For the automatic transmission represented schematically in FIG. 2, comprising the five shift elements 13-17, application of a shift matrix 18, shown in FIG. 3 enables eight forward gears and one reverse gear to be engaged, the eight forward gears "1"-"8" and the reverse gear "R" being entered in the left-hand column of the shift matrix 18 and the shift elements A to E along the top line of the matrix 18. Shift elements marked with a spot in the shift element matrix 18 are engaged when the corresponding gear is engaged.

According to the matrix, in each forward gear and in the reverse gear, respectively three of the five shift elements are engaged and two shift elements are disengaged in each case. Thus for example, for forward gear "1", the shift elements A, B and C are engaged and the shift elements D and E are disengaged. For the reverse gear "R", shift elements A, B and D are engaged and shift elements C and E are disengaged.

Accordingly, for force transfer or torque transfer from the transmission input 11 to the transmission output 12, in the automatic transmission represented in FIG. 2, three shift elements are engaged in each gear while, in contrast, two shift elements are disengaged.

To improve the shifting speed, successive upshifts or successive downshifts are carried out with some overlap such that, during a first upshift or downshift, at least one shift element needed for the subsequent second upshift or downshift is prepared while the first upshift or downshift is in progress and that, as soon as a synchronization point of the first upshift or downshift in progress is reached, the next second upshift or downshift can be carried out immediately.

The Table below shows, in its left-hand column, examples of the downshifts and upshifts that can be carried out with overlap by the automatic transmission 2, shown in FIGS. 2, 3, such that when, in the left-hand column, a downshift or upshift is entered in brackets after another downshift or upshift, the downshift or upshift not in brackets is the first downshift or upshift and the downshift or upshift in brackets is the second downshift or upshift for which, at least one shift element is prepared while the first downshift or upshift is in progress.

In the Table shift, elements which are closed and thus engaged during a first upshift or downshift to be carried out are denoted "e". Shift elements which, in contrast, are open and thus disengaged during a first upshift or downshift are denoted "d" in the Table below. Shift elements which, during a first upshift or downshift, are prepared for engaging and thus engagement or for opening and thus disengagement with a view to a subsequent second upshift or downshift, are respectively denoted "pe" or "pd" in the Table below.

When shift elements are marked "e/pd" or "d/pe" in the Table, this means that the shift elements in question are involved in both the first and in the subsequent second upshift or downshift so that on transition from the first upshift or downshift, there is a minimum number or a maximum number of shift elements available for implementation. Shift elements marked "x" are and remain engaged during an upshift or downshift. In contrast, shift elements marked "-" are and remain disengaged during an upshift or downshift.

|  | SHIFT ELEMENTS | | | | |
| --- | --- | --- | --- | --- | --- |
|  | A | B | C | D | E |
| DOWNSHIFT | | | | | |
| 8-7 (7-6) | pd | — | e | x | d/pe |
| 7-6 (6-5) | d | pe | — | x | e/pd |
| 6-5 (6-4) | — | e | pd | x | d/pe |
| 5-4 (4-3) | — | x | d/pe | pd | e |
| 4-3 (3-2) | pe | x | e/pd | d | — |
| 3-2 (2-1) | e | x | d/pe | — | pd |
| 6-4 (4-3) | — | e | d/pe | pd | x |
| 8-6 (6-4) | d | pe | e/pd | x | x |
| 5-3 (3-1) | pe | x | x | d | e/pd |
| UPSHIFT | | | | | |
| 1-2 (2-3) | pd | x | d/pe | — | e |
| 2-3 (3-4) | d | x | e/pd | pe | x |
| 3-4 (5-6) | — | x | d/pe | e | pd |
| 4-5 (5-6) | — | pd | e | x | d/pe |
| 5-6 (6-7) | pe | d | x | x | e/pd |
| 6-7 (7-8) | e | — | pd | x | d/pe |
| 3-5 (5-6) | — | pd | x | e | d/pe |
| 4-6 (6-8) | pe | d | e/pd | x | x |

In using the above Table for the automatic transmission of FIGS. 2 and 3, depending on the gear change that is to be carried out from a current gear to a desired gear, either multiple shifts or single shifts are carried out as both the first upshifts and the first downshifts. While a multiple shift is in progress as the first upshift or downshift, a single or multiple shift is prepared for as the second, subsequent upshift or downshift. Upshifts or downshifts carried out as multiple shifts are double shifts.

According to a first embodiment of the present invention, in accordance with a first alternative when a first upshift or downshift is carried out, a first shift element is opened and thus disengaged and a second shift element is closed and thus engaged. While this first upshift or downshift is being carried out, with a view to the subsequent second upshift or downshift, the second shift element is prepared for opening and thus disengagement. While the first upshift or downshift is in progress, a third shift element is prepared for closing and thus engagement. While the first and also the second upshifts or downshifts are in progress, at least a fourth shift element is kept engaged or nearly so.

On transition from the first upshift or downshift to the subsequent second upshift or downshift, the second shift element, which is active both in the first and in the subsequent second upshift or downshift, is actuated through selection of a minimum number of shift elements.

This first alternative of the first embodiment of the present invention will be described below with reference to FIG. 4, considering the example of two successive downshifts carried out as overlapping single shifts. According to the above table, these could be the downshifts 8-7 (7-6), for example.

FIG. 4 shows the time variations of various signals: a signal variation 19 represents a driver's-wish-dependent desired gear; a signal variation 20 represents a target gear determined on the basis of the desired gear; a signal variation 21 represents a gear currently engaged; a signal variation 22 represents a torque of the drive motor 1 of the drivetrain, and a signal variation 23 represents a speed of the drive motor 1. The signal variations 24, 25, 26, 27 and 28 represent the actuation or behavior in time of four shift elements involved in the overlapping implementation of two successive downshifts; signal variation 24 representing the time behavior of a first shift element to be opened and thus disengaged during the first downshift; signal variation 27 representing the time behavior of the second shift element to be opened and thus disengaged during the first downshift; signal variation 26 representing the time behavior of the second shift element to be prepared for opening and thus disengagement during the first downshift with a view to the subsequent second downshift, and signal variation 25 representing the time behavior of the third shift element to be prepared for closing and thus engagement during the implementation of the first downshift with a view to the subsequent second downshift. Signal variation 28 represents the time behavior of the fourth shift element, which is kept engaged or nearly engaged while the first and the second downshifts are in progress.

Thus, the signal variations 26 and 27 each concern the second shift element, which is active during both the first downshift and the subsequent second downshift; in the signal variations 26 and 27, the solid line represents an active operating sequence of the second shift element and the broken line represents a passive background calculation for the second shift element.

At time A, there is a change of the desired gear (see signal variation 19) and, derived from this, a change of the target gear (see signal variation 20) by way of a desired downshift through one gear (x-1), this then triggering the overlapped implementation or preparation of successive downshifts, namely in such manner that at time A, on one hand, the first shift element that is to be opened and thus disengaged while the first downshift is carried out (see signal variation 24) begins its shift phase and, on the other hand, the second shift element that is to be closed and thus engaged while the first downshift is carried out (see signal variation 27) undergoes rapid filling, which takes place between times A and B.

The second shift element, which is to be prepared with a view to the subsequent second downshift by way of a background calculation while the first downshift is in progress (see signal variation 26), and the third shift element (see signal variation 25) are set to a defined condition at time A. The fourth shift element (see signal variation 28) remains engaged.

On completion of the rapid filling of the second shift element that is to be closed and, therefore, engaged in the first downshift (see signal variation 27), the second shift element changes from the rapid filling phase to a filling equalization phase, this filling equalization phase extending between times B and D.

The rapid filling phase between times A and B and the filling equalization phase between times B and D together define the entire filling phase of the second shift element that is to be engaged during the first downshift. At time D, the second shift element to be closed and, therefore, engaged during the first downshift (see signal variation 27), changes from the filling phase to the shift phase.

While the first downshift is being carried out, during which the first shift element, in accordance with signal variation 24, is opened and thus disengaged and the second shift element, in accordance with signal variation 27, is closed and thus engaged, shift elements are prepared for a possible subsequent second downshift. Thus at time C, the preparation of the third shift element (see signal variation 25), that will be closed and thus engaged in a possible subsequent second downshift, takes place by rapid filling, which lasts between times C and E. On completion of the rapid filling of the third shift element at time E, begins a filling equalization phase which, as shown in FIG. 4, lasts until time G.

Likewise, while the first downshift is in progress, with a view to a subsequent second downshift the second shift element, which was already involved in the first downshift, is prepared for opening or disengagement (see signal variation 26) by way of a passive background calculation. At time F, a transition phase of the second shift element prepared for disengagement with a view to the subsequent second downshift is started and, at time H, which corresponds to a synchronization point of the first downshift, a change from the first downshift to the subsequent second downshift takes place. The fourth shift element is kept engaged (see signal variation 28).

At time H, for the second shift element, which is closed and thus engaged in the first downshift and opened and thus disengaged in the subsequent second downshift, in relation to the first downshift, there occurs a transition from an active sequence to a passive background calculation and in relation to the subsequent second downshift a transition from a passive background calculation to an active sequence. When time H, but at the latest when time I, is reached, the shift elements prepared, during the first downshift, are accordingly the active shift elements of the subsequent second downshift. The fourth shift element (see signal variation 28) is also kept engaged during the second downshift.

By analogy with the first downshift, during the subsequent second downshift shift elements undergo preparation for a possible subsequent third downshift (see signal variations 29 and 30).

All the downshifts, listed in the above Table, can be carried out in accordance with the above procedure so that, for example, for the downshifts 8-6 (6-4), two fourth shift elements are kept engaged during the first and the subsequent second downshift.

According to a second embodiment of the present invention, during the implementation of the first downshift, with a view to the subsequent second downshift, the third shift element that is to be engaged during the second downshift (see signal variation 25) is prepared for engaging by rapid filling at a time C, which occurs before the synchronization point of the first downshift, in progress, has been reached at time H by a first time interval $T_1$, applicable in a time-controlled or event-controlled way. The first time interval $T_1$ applicable by time or event control can be determined, for example, by virtue of a time reserve or a speed difference relative to the synchronization point H of the first downshift.

As shown in FIG. 4, if time C is determined from the synchronization point H and the applicable time interval $T_1$ occurs later than the end of the rapid filling phase of the second shift element to be engaged, i.e., later than time B, then the preparation of the third shift element, which is to be engaged during the second downshift (see signal variation 25), is started immediately. On the other hand, determined from the synchronization point H of the first downshift in progress and from the applied first time interval $T_1$, if time C occurs earlier than the end (time B) of the rapid filling phase of the second shift element to be engaged during the first downshift, the preparation of the third shift element is delayed until the rapid filling phase of the second shift element to be engaged during the first downshift, has been completed.

As already mentioned, the third shift element, which is prepared for engaging with a view to the second downshift while the first downshift is taking place (see signal variation 25), is changed over at time G from the preparation phase to the shift phase, this time G, occurring before the synchronization point H of the first downshift has been reached by a second time interval $T_2$, which can be determined as a function of time or events.

As shown in FIG. 4, if this time G, determined from the synchronization point H of the first downshift and the applicable second time interval $T_2$, occurs later than the end of the rapid filling phase (time E) of the third shift element that is to be engaged during the second downshift, the third shift element to be engaged during the second downshift is changed directly from the preparation phase to the shift phase.

On the other hand, if the time G, determined from the synchronization point H of the first downshift in progress and the applicable second time interval $T_2$, occurs earlier than the end of the rapid filling phase (time E) of the third shift element due to be engaged during the second downshift, then the change of the third shift element from its preparation phase to its shift phase is delayed until the rapid filling phase of the third shift element has been completed.

As already explained above, the third shift element prepared in the sense of a background calculation during the implementation of the first downshift for opening and thus disengagement with a view to the subsequent second downshift is changed at time F from its preparation phase to its shift phase. This time F occurs before the synchronization point H of the first downshift has been reached by a third time interval $T_3$ applied in a time-controlled or event-controlled way. In the example embodiment shown, at time F, it is decided whether the second downshift, prepared for during the first downshift, will actually be carried out. Namely, a prepared next downshift is only actually carried out if the driver so wishes. From FIG. 4, it can be seen that at time F, in accordance with the signal variation 19, which represents the driver's wishes, a further downshift (x-2) is called for in order to reach the desired gear so, in the example of FIG. 4, the second downshift is then also actually carried out.

As already explained above, during the second corresponding shift elements are prepared in accordance with signal variations 29 and 30 for a third subsequent downshift such that, in FIG. 4, with a view to the third downshift to be prepared for during the second downshift, the corresponding applicable first time interval $T'_1$, second time interval $T'_2$ and third time interval $T'_3$ relate to a synchronization point H' of the second downshift.

From FIG. 4, it can be seen that at a time defined by the synchronization point H' of the second downshift and the applicable third time interval $T'_3$, on the basis of the signal variation 19 that represents the driver's wishes, no further downshift is required in order to reach the desired gear, so the third downshift prepared for while the second downshift is taking place is not carried out, but is instead discontinued. As can be seen from FIG. 4, in accordance with the signal variation 21, the current gear is set to a new value by recognition of the synchronization points H or H' of a shift carried out while, in accordance with the signal variation 20, the target gear changes to the next gear or remains unchanged depending on the desired gear, according to the signal variation 19.

According to a third embodiment of the present invention, in the example embodiment shown in FIG. 4, during the implementation of the first downshift and during that of the second downshift, torque of the drive motor is increased and/or reduced, compared with a drive motor torque derived from the driver's wish, in order to support the overlapped implementation of the successive downshifts. Thus the signal variation 22, represented in FIG. 4 as a solid line, corresponds to a drive motor torque derived from a driver's wish.

According to a first variation indicated in FIG. 4 as a dot-dash line, during the implementation of both the first and the second downshifts, the drive motor torque is increased, relative to the drive motor torque derived from the driver's wish. In contrast, according to a second variation indicated in FIG. 4 as a dotted line, at the end of the second downshift, the drive motor torque is reduced relative to the drive motor torque derived from the driver's wish. Below, both variations will be explained in more detail.

The increase of the drive motor torque, indicated in FIG. 4 as a dot-dash line, relative to the drive motor torque derived from the driver's wish, takes place when the drivetrain is operated either in thrust mode or in part-load traction mode. During every downshift carried out in thrust or part-load traction operation, the drive motor torque is increased relative to the torque derived from the driver's wish, and during each downshift carried out, it is checked whether a prepared subsequent downshift corresponds to the driver's wish. This is done at a time that depends, on one hand, on the synchronization point H and, on the other hand, on the applicable third time interval $T_3$, i.e., in the example embodiment of FIG. 4 at time F.

When, at this time, on the basis of the driver's wish, a subsequent downshift is required, the amount of torque during the first downshift is changed to the amount of torque during the second downshift and, it can be seen in the example embodiment illustrated, that the amount of torque during the second downshift is larger than that during the first downshift. In contrast, it can also be that the amount of torque of the second downshift is smaller than that of the first downshift. Likewise, the two torques can be of equal size. Preferably, between the two torque amounts, there is a ramp-like transition.

In contrast, at the above time defined by the synchronization point H and the applicable third time interval $T_3$, on the basis of the driver's wish, if no subsequent downshift is required, the prepared follow-up downshift is broken off and the drive motor torque elevation is ended in order to complete the shift. This is shown in FIG. 4 for the third downshift prepared during the second downshift.

During the implementation and preparation of successive downshifts, when the drivetrain is operating in traction mode, during each downshift carried out, at a time applicable by virtue of time- or event-control, namely at the time that depends on the synchronization point H and the applicable third time interval $T_3$, it is checked whether a prepared next shift corresponds to a driver's wish. As shown in FIG. 4, if for the third downshift prepared for during the second downshift, this is not the case, then the prepared follow-up downshift is broken off and in order to complete the shift in traction operation, the drive motor torque reduction, represented in the signal variation 22 of FIG. 4 as a dotted line relative to the torque derived from the driver's wish, is carried out.

In contrast, at the time, when a subsequent downshift is desired, as is the case in FIG. 4 for the second downshift prepared for during the first downshift, the drive motor torque reduction is not carried out. Accordingly, torque reduction during downshifts only takes place when a shift process is to be ended, i.e., when no subsequent shift is required.

Furthermore, the above torque reduction only takes place during traction operation, and then both under full load and under part load. On the other hand, during thrust operation, this torque reduction does not take place during downshifts.

In the example embodiment of FIG. 4, two successive downshifts can be carried out and prepared for by the actuation of four shift elements such that, as shown in FIG. 4, to carry out the first downshift, a first shift element (see signal variation 24) is opened and thus disengaged and a second shift element (see signal variation 27) is closed and thus engaged.

While the first downshift is being carried out, with a view to the subsequent second downshift, the second shift element (see signal variation 26) is prepared for opening and thus disengagement and a third shift element (see signal variation 25) is prepared for closing and thus engagement. A fourth shift element (see signal variation 28) is kept engaged during the first and second downshifts. On transition from the first to the subsequent second downshift, the second shift element is selected from a minimum number of shift element between the signal variations 26 and 27.

Figure 6:
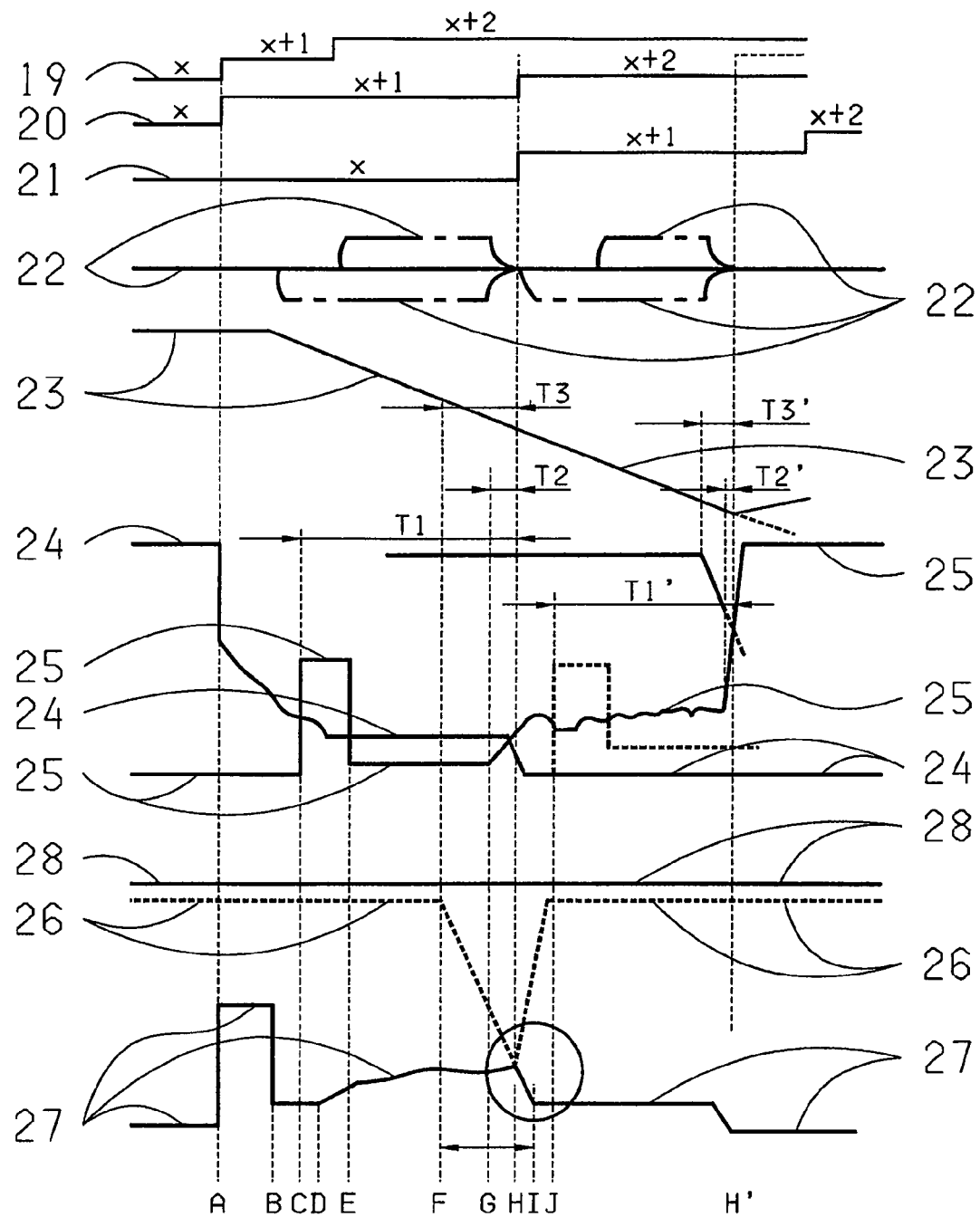
FIG. 6 is a third diagram to aid in understanding the method, according to the invention, for operating a drivetrain of a motor vehicle, which comprises an automatic transmission, according to FIGS. 2 and 3.

FIG. 6 shows a procedure, according to the invention, for carrying out and preparing successive upshifts as overlapped single shifts. In relation to the control of the four shift elements in accordance with the first and second embodiments of the present invention, there are no differences from the procedure of FIG. 4, so that to avoid unnecessary repetitions the same indices will be used for the example in FIG. 6.

To carry out successive upshifts in accordance with FIG. 6, compared with carrying out successive downshifts as in FIG. 4, there is only one difference relating to the third embodiment of the present invention, which concerns increasing or reducing the drive motor torque compared with a drive motor torque derived from a driver's wish. Thus according to FIG. 6, for successive upshifts during thrust operation of the drivetrain, the torque is elevated for both upshifts in accordance with the dot-dash line of signal variation 22 while, in contrast, during traction operation of the drivetrain, the torque is reduced for both upshifts as shown by the dotted line of signal variation 22.

A second alternative of the first embodiment of the invention for carrying out successive downshifts or successive upshifts as overlapped shifts is described below with reference to FIG. 5, considering the example of successive downshifts, and again for the example embodiment of FIG. 5, the same indices are used as for that of FIG. 4.

Figure 5:
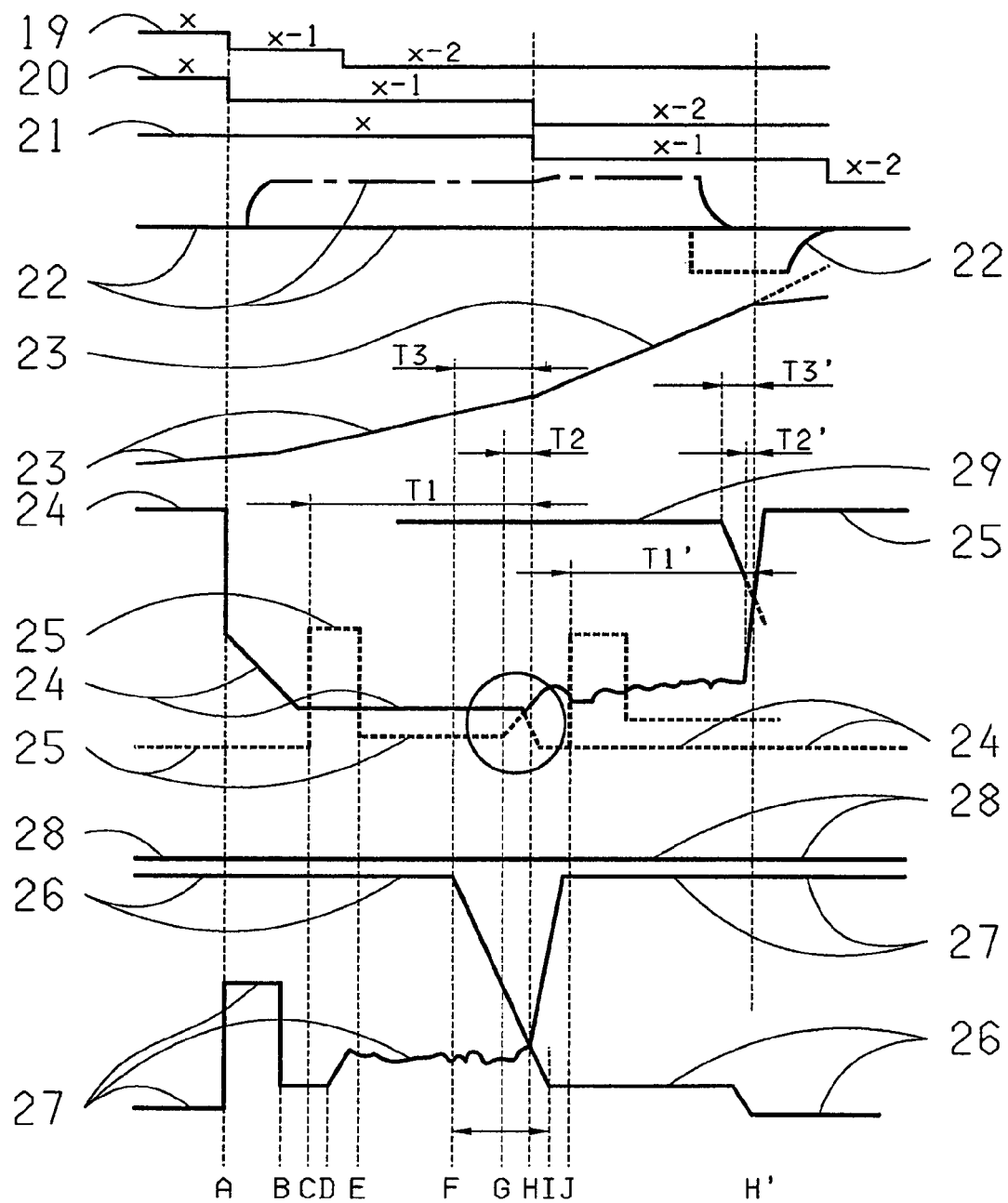
FIG. 5 is a second diagram to aid in understanding the method according to the invention, for operating a drivetrain of a motor vehicle, which comprises an automatic transmission, according to FIGS. 2 and 3.

Thus, according to the second alternative of the first embodiment of the present invention represented in FIG. 5, two successive downshifts can be carried out by actuating four shift elements in such a manner that to carry out the first downshift, a first shift element (see signal variation 27) is closed and thus engaged and a second shift element (see signal variation 24) is opened and thus disengaged.

While the first downshift is being carried out, with a view to a subsequent second downshift, the second shift element (see signal variation 25) is prepared for closing and thus engagement in the sense of a background calculation, and a third shift element (see signal variation 26) is prepared for opening and, therefore, disengagement. At least one fourth shift element (see signal variation 28) is kept engaged or nearly engaged while the first downshift and while the second downshift are being carried out.

Accordingly, in the example embodiment of FIG. 5, as well as the second shift element has a dual function and is active during both the first and the second downshifts and, in accordance with this second alternative of the first embodiment of the invention, the control of the second shift element when changing from the first downshift to the second downshift takes place by way of selecting from a maximum amount of shift elements.

At time A in FIG. 5, a change of the desired gear (see signal variation 19) occurs and, derived from this, a change of the target gear (see signal variation 20) by way of a desired downshift by one gear (x-1), which triggers the overlapping implementation or preparation of successive downshifts, namely in such a manner that at time A, on one hand, the first shift element (signal variation 27) that is to be closed and thus engaged when the first downshift is carried out is subjected to rapid filling, this rapid filling taking place between times A and B and, on the other hand, the second shift element (signal variation 24) that is to be opened and thus disengaged when the first downshift is carried out, begins its shift phase.

The second shift element (signal variation 25), which is to be prepared by way of a background calculation for the subsequent second downshift while the first downshift is being carried out and the third shift element (signal variation 26), are set to a defined condition at time A. The fourth shift element (signal variation 28) is kept engaged.

On completion of the rapid filling of the first shift element (signal variation 27) to be closed and engaged for the first downshift, the first shift element passes from the rapid filling phase to a filling equalization phase; this filling equalization phase lasting between times B and D. Taken together, the rapid filling and filling equalization phases define the entire filling phase of the first shift element to be engaged during the first downshift.

At time D, the first shift element (signal variation 27), which is to be closed and thus engaged during the first downshift, is changed from the filling phase to the shift phase.

During the implementation of the first downshift, in which the second shift element (signal variation 24) is opened and thus disengaged and the first shift element (signal variation 27) is closed and thus engaged, shift elements are prepared for the possibility that a subsequent second downshift has to be carried out. Thus at time C, the preparation of the second shift element (signal variation 25) that will be closed and thus engaged in the event of a subsequent second downshift, by way of a background calculation, takes place by rapid filling, which lasts between times C and E. On completion of the rapid filling at time E, the shift element changes to a filling equalization phase which, as shown in FIG. 4, lasts until time G.

While the first downshift is being carried out, in case there is to be a subsequent second downshift, the third shift element (signal variation 26) is also prepared for opening or disengagement. At time F, a transition phase of the third shift element, prepared for the subsequent second downshift is started. The fourth shift element (signal variation 28) is kept engaged.

Between times G and H, for the second shift element which is opened and thus disengaged in the first downshift and closed and, therefore, engaged in the subsequent second downshift, a transition from an active sequence to a passive background calculation takes place in relation to the first downshift and, in relation to the subsequent second downshift, a transition from a passive background calculation to an active sequence. Accordingly on reaching time H, the shift elements, prepared during the first downshift, become the active shift elements of the subsequent second downshift. The fourth shift element (signal variation 28) is kept engaged.

By analogy with the first downshift, during the subsequent second downshift shift elements are prepared for the eventuality of a third subsequent downshift (see signal variations 29 and 30).

In relation to the second embodiment of the present invention, i.e., in relation to the applicable time intervals $T_1$, $T_2$ and $T_3$ on whose basis, on one hand, the preparation of the shift element to be engaged during the second downshift and the transition of the shift elements to be engaged or disengaged during the second downshift from the preparation phase to the shift phase take place, the example embodiment of FIG. 5 corresponds to the example embodiment of FIG. 4, so reference should be made to the description given earlier in this connection.

Furthermore, in relation to the third embodiment of the present invention, the example embodiment of FIG. 5 corresponds to the example embodiment of FIG. 4, i.e., in relation to the details concerning the drive motor torque increase or torque reduction while carrying out overlapping downshifts. Concerning these details too, reference can be made to the earlier descriptions.

Finally, let it also be said that successive upshifts can be carried out as overlapping single shifts by analogy with the example embodiment of FIG. 5, in accordance with the second alternative of the first embodiment of the invention.

| Reference numerals | |
|---|---|
| 1 | drive motor |
| 2 | automatic transmission |
| 3 | wheel |
| 4 | arrow |
| 5 | arrow |
| 6 | transmission layout |
| 7 | transmission gearset |
| 8 | transmission gearset |
| 9 | transmission gearset |
| 10 | transmission gearset |
| 11 | transmission input |
| 12 | transmission output |
| 13 | shift element A |
| 14 | shift element B |
| 15 | shift element C |
| 16 | shift element D |
| 17 | shift element E |
| 18 | shift element matrix |
| 19 | signal variation |
| 20 | signal variation |
| 21 | signal variation |
| 22 | signal variation |
| 23 | signal variation |
| 24 | signal variation |
| 25 | signal variation |
| 26 | signal variation |
| 27 | signal variation |
| 28 | signal variation |

| -continued | |
|---|---|
| Reference numerals | |
| 29 | signal variation |
| 30 | signal variation |

The invention claimed is:

1. A method of operating of a drivetrain of a motor vehicle having at least a drive motor and an automatic transmission with at least five shift elements, the method improving a shift speed of at least one of a successive upshift and a successive downshift, such that during a first upshift or a first downshift, at least one shift element, required for the respective successive upshift or the successive downshift, is prepared such that when a synchronization point of the first upshift or the first downshift in progress is reached, the successive upshift or the successive downshift can be immediately carried out, the method comprising the steps of:

requiring at least three of the at least five shift elements be engaged and a remainder of the at least five shift elements be disengaged, in each of a plurality of forward and reverse gears for transferring one of torque and force, and two respective consecutive upshifts or two respective consecutive downshifts are accomplished with at least some overlap;

carrying out the first upshift or the first downshift, according to one of two alternatives, giving consideration to the successive upshift or the successive downshift, in a first alternative, a first shift element is disengaged and a second shift element is engaged and in a second alternative, the first shift element is engaged and the second shift element is disengaged;

preparing the second shift element for one of engagement or disengagement, while the first upshift or the first downshift is being carried out while giving consideration to the successive upshift or the successive downshift, according to one of the two alternatives, in the first alternative, the second shift element is prepared for disengaging and a third shift element is prepared for engaging, and in the second alternative, the second shift element is prepared for engaging and the third shift element is prepared for disengaging;

selecting the second shift element for one of engagement or disengagement, in the first alternative, from a minimum number of the five shift elements and, in the second alternative, from a maximum number of the five shift elements;

one of engaging or disengaging the second shift element upon transition from the first upshift or the first downshift to the successive upshift or the successive downshift; and retaining at least one fourth shift element at least partially engaged while the first upshift or the first downshift is being carried out and while the successive upshift or the successive downshift is being carried out.

2. The method according to claim 1, further comprising the steps of:

performing a passive background calculation during the first upshift or the first downshift, to prepare the second shift element, involved with an active operating sequence in the first upshift or the first downshift, for the successive upshift or the successive downshift; and preparing the second shift element, with the passive background calculation, for the successive upshift or the successive downshift upon transition from the first upshift or the first downshift to the successive upshift or the successive downshift, which occurs when the synchronization point is reached.

3. The method according to claim 2, further comprising the step of performing another passive background calculation for the second shift element during the successive upshift or the successive downshift, when the second shift element is involved in the successive upshift or the successive downshift with an active sequence.

4. The method according to claim 1, further comprising the steps of:
preparing two shift elements of the at least five shift elements for a subsequent upshift or a subsequent downshift during implementation of a previous upshift or a previous downshift; and
carrying out the subsequent upshift or the subsequent downshift only if, at a time applicable in a time-controlled manner or an event-controlled manner, the subsequent upshift or the subsequent downshift corresponds to a driver's wish.

5. A method of operating of a drivetrain of a motor vehicle having at least a drive motor and an automatic transmission with at least five shift elements, the method improving a shift speed of at least one of a successive upshift and a successive downshift such that, during a first upshift or a first downshift, at least one shift element, required for the respective successive upshift or the successive downshift, is prepared such that when a synchronization point of the first upshift or the first downshift in progress is reached, the successive upshift or the successive downshift can be immediately carried out, the method comprising the steps of:
requiring at least three of the at least five shift elements be engaged and a remainder of the at least five shift elements be disengaged, in each of a plurality of forward and reverse gears for transferring one of torque and force;
preparing the at least one shift element, to be engaged during the successive upshift or the successive downshift, at a time before reaching the synchronization point of the first upshift or the first downshift in progress, by a first time interval, that is applied in a time-controlled manner or an event-controlled manner for engagement, while the first upshift or the first downshift is being carried out while giving consideration to the successive upshift or the successive downshift; and
delaying the preparation of the at least one shift element to be engaged during the successive upshift or the successive downshift, until a rapid filling phase of a first shift element to be engaged during the first upshift or the first downshift is completed, if a time, determined from the synchronization point of the first upshift or the first downshift in progress and the first time interval, occurs before the end of the rapid filling phase of the first shift element that is to be engaged during the first upshift or the first downshift, preparation of the at least one shift element to be engaged during the successive upshift or the successive downshift is delayed until the rapid filling phase of the first shift element to be engaged during the first upshift or the first downshift is completed; and
immediately beginning preparation of the at least one shift element to be engaged during the successive upshift or the successive downshift.

6. A method of operating of a drivetrain of a motor vehicle having at least a drive motor and an automatic transmission with at least five shift elements, the method improving a shift speed of at least one of a successive upshift and a successive downshift such that, during a first upshift or a first downshift, at least one shift element, required for the respective successive upshift or the successive downshift, is prepared such that when a synchronization point of the first upshift or the first downshift in progress is reached, the successive unshift or the successive downshift can be immediately carried out, the method comprising the steps of:
requiring at least three of the at least five shift elements be engaged and a remainder of the at least five shift elements be disengaged, in each of a plurality of forward and reverse gears for transferring one of torque and force;
preparing the at least one shift element, to be engaged during the successive upshift or the successive downshift, at a time before reaching the synchronization point of the first upshift or the first downshift in progress, by a first time interval, that is applied in a time-controlled manner or an event-controlled manner for engagement, while the first upshift or the first downshift is being carried out while giving consideration to the successive upshift or the successive downshift; and
changing the at least one shift element, prepared to be engaged during the successive upshift or the successive downshift, from a preparation phase to a shift phase at a time before reaching the synchronization point of the first upshift or the first downshift, by a second time interval applied in a time-controlled manner or an event-controlled manner.

7. The method according to claim 6, further comprising the step of delaying the step of changing the at least one shift element, prepared to be engaged during the successive upshift or the successive downshift, from the preparation phase to the shift phase, until the rapid filling phase the at least one shift element to be engaged during the successive upshift or the successive downshift has been completed, if the time before reaching the synchronization point of the first upshift or the first downshift and the second time interval occurs before the end of a rapid filling phase of the at least one shift element to be engaged during the successive upshift or the successive downshift; or immediately changing the at least one shift element to be engaged during the successive upshift or the successive downshift from the preparation phase to the shift phase.

8. A method of operating of a drivetrain of a motor vehicle having at least a drive motor and an automatic transmission with at least five shift elements, the method improving a shift speed of at least one of a successive upshift and a successive downshift such that, during a first upshift or a first downshift, at least one shift element, required for the respective successive upshift or the successive downshift, is prepared such that when a synchronization point of the first upshift or the first downshift in progress is reached, the successive upshift or the successive downshift can be immediately carried out, the method comprising the steps of:
requiring at least three of the at least five shift elements be engaged and a remainder of the at least five shift elements be disengaged, in each of a plurality of forward and reverse gears for transferring one of torque and force;
preparing the at least one shift element, to be engaged during the successive upshift or the successive downshift, at a time before reaching the synchronization point of the first upshift or the first downshift in progress, by a first time interval, that is applied in a time-controlled manner or an event-controlled manner for engagement, while the first upshift or the first downshift is being carried out while giving consideration to the successive upshift or the successive downshift and preparing the at least one shift element to be disengaged during the successive upshift or the successive downshift during the first upshift or the first downshift, while giving consideration to the successive upshift or the successive downshift, for disengaging, at the beginning of the first upshift or the first downshift; and changing the at least one shift element prepared to be disengaged during the successive upshift or the successive downshift from a preparation phase to a shift phase, at the time before reaching the synchronization point of the first upshift or the first downshift, by a third time interval applicable in a time-controlled manner or an event-controlled manner.

9. A method of operating of a drivetrain of a motor vehicle having at least a drive motor and an automatic transmission with at least five shift elements, the method improving a shift speed of at least one of a successive upshift and a successive downshift, such that during a first upshift or a first downshift, at least one shift element, required for the respective successive unshift or the successive downshift, is prepared such that when a synchronization point of the first upshift or the first downshift in progress is reached, the successive upshift or the successive downshift can be immediately carried out, the method comprising the steps of:

requiring at least three of the at least five shift elements be engaged and a remainder of the at least five shift elements be disengaged, in each of a plurality of forward and reverse gears for transferring one of torque and force; and one of increasing and decreasing a torque of the drive motor, relative to a torque of the drive motor derived from a driver's wish, during at least one of the first upshift or the first downshift and the successive upshift or the successive downshift to assist in overlapped implementation of the successive upshifts or the successive downshifts; and checking, during each downshift carried out and at a time applicable in a time-controlled manner or an event-controlled manner, whether a prepared follow-up shift, corresponds with a driver's wish to carry out further successive downshifts during traction operation of the drivetrain, if no follow-up shift is desired, the prepared follow-up shift is discontinued and the torque of the drive motor torque is reduced relative to the torque of the drive motor derived from the driver's wish, but if the follow-up shift is desired, on the basis of the drivers wish, the prepared follow-up shift is carried out and the torque of the drive motor is not reduced.

10. A method of operating of a drivetrain of a motor vehicle having at least a drive motor and an automatic transmission with at least five shift elements, the method improving a shift speed of at least one of a successive upshift and a successive downshift, such that during a first upshift or a first downshift, at least one shift element, required for the respective successive upshift or the successive downshift, is prepared such that when a synchronization point of the first upshift or the first downshift in progress is reached, the successive upshift or the successive downshift can be immediately carried out, the method comprising the steps of:

requiring at least three of the at least five shift elements be engaged and a remainder of the at least five shift elements be disengaged, in each of a plurality of forward and reverse pears for transferring one of torque and force; and one of increasing and decreasing a torque of the drive motor, relative to a torque of the drive motor derived from a driver's wish, during at least one of the first upshift or the first downshift and the successive upshift or the successive downshift to assist in overlapped implementation of the successive upshifts or the successive downshifts; and increasing the torque of the drive motor relative to torque of the drive motor derived from the drivers wish, during each downshift carried out and also checking, during each downshift carried out and at the time applicable in a time-controlled manner or an event-controlled manner, whether a prepared follow-up shift corresponds to the driver's wish, to carry out a follow-up downshifts when the drivetrain is in a thrust operation or a part-load traction operation, if the follow-up downshift is desired, a ramp-like transition, is effected between torque levels of the follow-up downshifts, but if the follow-up shift is not desired, the prepared follow-up shift is discontinued and the torque of the drive motor is discontinued to prevent the follow-up downshift.

11. A method of operating of a drivetrain of a motor vehicle having at least a drive motor and an automatic transmission with at least five shift elements, the method improving a shift speed of at least one of a successive upshift and a successive downshift, such that during a first upshift or a first downshift, at least one shift element, required for the respective successive upshift or the successive downshift, is prepared such that when a synchronization point of the first upshift or the first downshift in progress is reached, the successive upshift or the successive downshift can be immediately carried out, the method comprising the steps of:

requiring at least three of the at least five shift elements be engaged and a remainder of the at least five shift elements be disengaged, in each of a plurality of forward and reverse gears for transferring one of torque and force; and one of increasing and decreasing a torque of the drive motor, relative to a torque of the drive motor derived from a driver's wish, during at least one of the first upshift or the first downshift and the successive upshift or the successive downshift to assist in overlapped implementation of the successive upshifts or the successive downshifts; and reducing the torque of the drive motor relative to the torque derived from the driver's wish, during traction operation of the drivetrain to carry out the successive upshifts; and increasing the torque of the drive motor relative to the torque derived from the driver's wish, during each of the successive upshifts carried out to carry out the successive upshifts during thrust operation of the drivetrain.

* * * * *